(12) United States Patent
Song et al.

(10) Patent No.: US 9,294,217 B2
(45) Date of Patent: Mar. 22, 2016

(54) OPTICAL SIGNAL MULTIPLEXING METHOD AND OPTICAL MULTIPLEXER

(71) Applicant: HUAWEI TECHNOLOGIES CO., LTD., Shenzhen (CN)

(72) Inventors: Xiaolu Song, Shenzhen (CN); Wenbin Jiang, Santa Clara, CA (US); Qi Deng, Santa Clara, CA (US); Li Zeng, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 54 days.

(21) Appl. No.: 14/154,362

(22) Filed: Jan. 14, 2014

(65) Prior Publication Data
US 2014/0126909 A1  May 8, 2014

Related U.S. Application Data

(63) Continuation of application No. PCT/CN2011/077161, filed on Jul. 14, 2011.

(51) Int. Cl.
*H04J 14/06* (2006.01)
*G02B 27/28* (2006.01)
*G02B 6/27* (2006.01)

(52) U.S. Cl.
CPC ............... *H04J 14/06* (2013.01); *G02B 6/2713* (2013.01); *G02B 6/2773* (2013.01); *G02B 27/283* (2013.01)

(58) Field of Classification Search
CPC ..... H04J 14/06; G02B 6/2713; G02B 6/2773; G02B 27/283
USPC .......................................................... 398/65
See application file for complete search history.

(56) References Cited

U.S. PATENT DOCUMENTS

| 8,098,989 B2 | 1/2012 | Yu |
| 2002/0131049 A1 | 9/2002 | Schmitt |

(Continued)

FOREIGN PATENT DOCUMENTS

| CN | 1972046 A | 5/2007 |
| CN | 101272214 A | 9/2008 |

(Continued)

OTHER PUBLICATIONS

Taraphdar, C. et al., *Polarization Encoded All-optical Ternary Max Gate*, 2009 International Conference on Computers and Devices for Communication, XP3162449A (4 pp.).
Extended European Search Report, dated Jun. 6, 2014, in corresponding European Application No. 11851916.4 (7 pp.).
Japanese Office Action mailed May 20, 2014 in corresponding Japanese Patent Application No. 2014-515032.
International Search Report mailed Dec. 15, 2011 in corresponding International Patent Application No. PCT/CN2011/077161.

(Continued)

*Primary Examiner* — M. R. Sedighian
(74) *Attorney, Agent, or Firm* — Staas & Halsey LLP (57) ABSTRACT

Embodiments of the present invention relate to the optical communication field and disclose an optical signal multiplexing method and an optical multiplexer. The method provided in the present invention includes: adjusting polarization states of two of four optical signals to be multiplexed, and preferably, mutually orthogonal to, the polarization states of the remaining two optical signals; combining one optical signal in the adjusted polarization state with one optical signal in the unadjusted polarization state into one optical signal through polarization multiplexing; and combining the two optical signals obtained through polarization multiplexing into one optical signal. When multiplexing is performed according to the solutions of the present invention, all optical signals are multiplexed into one optical signal based on polarization multiplexing, optical paths traveled by different optical signals differ slightly, and the optical power and the optical field energy distribution differ slightly between different optical signals in the finally multiplexed optical signal.

14 Claims, 6 Drawing Sheets

(56) References Cited

U.S. PATENT DOCUMENTS

| | | | |
|---|---|---|---|
| 2005/0058453 A1* | 3/2005 | Mostert et al. | 398/79 |
| 2007/0134001 A1 | 6/2007 | Kim et al. | |
| 2009/0279891 A1 | 11/2009 | Yu | |
| 2010/0061730 A1* | 3/2010 | Seki et al. | 398/79 |
| 2012/0189306 A1 | 7/2012 | Du et al. | |
| 2012/0207475 A1 | 8/2012 | Tian et al. | |

FOREIGN PATENT DOCUMENTS

| | | | | |
|---|---|---|---|---|
| CN | 101369716 A | | 2/2009 | |
| CN | 101729187 A | | 6/2010 | |
| CN | 101771471 A | | 7/2010 | |
| CN | 102045127 A | | 5/2011 | |
| JP | 2004-087958 | * | 3/2004 | H01S 5/022 |
| JP | 2004-87958 | | 3/2004 | |
| JP | 2010-61139 | | 3/2010 | |
| JP | 2014-503857 | | 2/2014 | |
| WO | WO 99/49605 | * | 9/1999 | H04J 14/02 |
| WO | WO9949605 | | 9/1999 | |
| WO | WO 2012100209 A2 | | 7/2012 | |

OTHER PUBLICATIONS

Y. Gu et al., "808 nmand 980 nm high power laser diode stack with wavelength coupling," *Optics and Precision Engineering*, vol. 17, No. 1, Jan. 2009, 12 pages.

Y. Gu et al., "808 nm Quasi-CW laser diode stack with polarization coupling," *Semiconductor Optoelectronics*, vol. 30, No. 1, Feb. 2009, 11 pages.

Y. Gu et al., "High power and high brightness diode laser device," *Infrared and Laser Engineering*, vol. 38, No. 3, Jun. 2009, 9 pages.

D. Law et al. (WG802.3—Ethernet Working Group), *IEEE Std 802.3ba™-2010: IEEE Standard for Information Technology—Telecommunications and information exchange between systems—Local and metropolitan area networks—Specific requirements, Part 3: Carrier Sense Multiple Access with Collision Detection (CSMA/CD) Access Method and Physical Layer Specifications, Amendment 4: Media Access Control Parameters, Physical Layers, and Management Parameters for 40 Gb/s and 100 Gb/s Operation*, IEEE Computer Society, Jun. 22, 2010, pp. i-xxii, 1-443 & 2 cover pages.

Japanese Office Action issued on Sep. 16, 2014 in corresponding Japanese Patent Application No. 2014-515032.

* cited by examiner

Adjust a polarization state of a first optical signal in the at least four optical signals so that the first optical signal and a second optical signal in the at least four optical signals can be combined through polarization multiplexing into one optical signal; and adjust a polarization state of a third optical signal in the at least four optical signals so that the third optical signal and a fourth optical signal in the at least four optical signals can be combined through polarization multiplexing into one optical signal ⟋ S1

Combine the first optical signal in the adjusted polarization state and the second optical signal through polarization multiplexing, and output a fifth optical signal; and combine the third optical signal in the adjusted polarization state and the fourth optical signal through polarization multiplexing, and output a sixth optical signal ⟋ S2

Change a propagation direction of either the fifth optical signal or the sixth optical signal, so that the optical signal and the other optical signal are combined into one optical signal ⟋ S3

FIG. 4

OPTICAL SIGNAL MULTIPLEXING METHOD AND OPTICAL MULTIPLEXER

CROSS-REFERENCE TO RELATED APPLICATIONS

This application is a continuation of International Application No. PCT/CN2011/077161, filed on Jul. 14, 2011, which is hereby incorporated by reference in its entirety.

TECHNICAL FIELD

Embodiments of the present invention relate to the communications field, and in particular, to an optical signal multiplexing method and an optical multiplexer.

BACKGROUND

Rapid growth of network traffic expedites on-going increase of the line card capacity of routers and transport devices. With development of the optical communications industry, technologies related to optical transceiver module on the client side are also evolving continuously. High-rate, low-cost, low-power-consumption, miniaturized and pluggable optical transceiver modules have gradually become a focus of attention of the industry.

In recent years, manufacturers of various modules have launched 100GE client-side modules consecutively, where most transmitter-side solutions employ four stand-alone TOSA (Transmitter Optical Subassembly, transmitter optical subassembly) devices, and an external optical MUX (multiplexer, multiplexer) device combines light output by the four TOSAs, and the light enters a single-mode fiber for transmission. Objectives of many vendors for next-generation optical modules are to reduce the volume and power consumption of transmitter-side key devices by designing an integrated TOSA, to make modules evolve toward miniaturized CFP2 or even CFP4 packages.

In the process of evolving toward the next-generation smaller packages, if the transmitter side of the module adopts an integrated TOSA design solution, it is necessary to integrate four lasers and MUX devices and even laser drivers into a TOSA. How to couple the light output by the four lasers into the single-mode fiber, that is, how to design an integrated optical 4:1 multiplexer device, becomes a hot topic of research. In the prior art, the optical MUX/DEMUX device may adopt a TFF (Thin Film Filter, thin film filter)-based or PLC (Planar Lightwave Circuit, planar lightwave circuit)-based design solution.

Figure 1A:
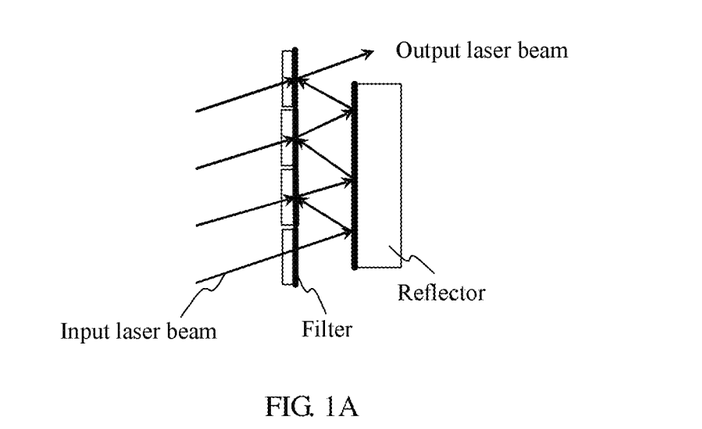
FIG. 1A is a schematic structural diagram of a first type of optical multiplexer in the prior art.

One of the existing MUX device design solutions is based on a Zig-Zag TFF. As shown in FIG. 1A, the light output by a multi-path laser is collimated by a lens, reflected and combined by a filter and a reflector for multiple times, and then coupled into a single-mode fiber. The filter array and the reflector make up an optical multiplexer, that is, the optical MUX.

Figure 1B:
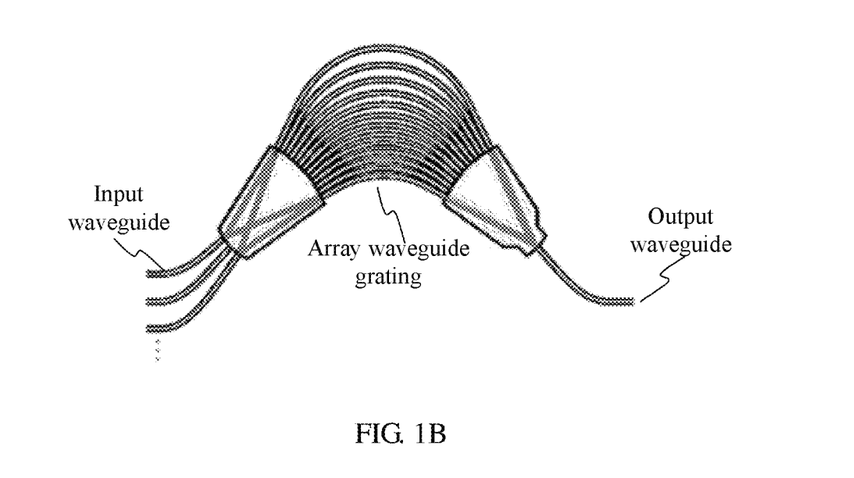
FIG. 1B is a schematic structural diagram of a second type of optical multiplexer in the prior art.

Another MUX device design solution in the prior art is to implement a PLC-based optical MUX device. As shown in FIG. 1B, the light output by the laser is combined by a PLC array-based waveguide grating and then coupled into the single-mode fiber for transmission.

However, the volume of the optical MUX device shown in FIG. 1A is too large and is not suitable for integration In addition, laser light in different channels in the optical MUX device is reflected for different numbers of times, and travels along significantly different optical paths. Consequently, the laser light output by different channels has significantly different incident optical power and optical field energy distribution. A great insertion loss exists in the coupling between the optical MUX device shown in FIG. 1B and the laser, and a great insertion loss also exists in the coupling between the MUX device and the fiber. To meet the application requirement of the system, the output optical power of the laser needs to be improved to compensate for the insertion loss, which leads to increase of the overall power consumption and deterioration of the system reliability.

SUMMARY

The present invention provides an optical signal multiplexing method and an optical multiplexer design solution to overcome such defects in the prior art as a large volume of the optical multiplexer, significant difference of output optical power and optical field energy distribution between different channels, and a great insertion loss generated in coupling with a fiber.

An embodiment of the present invention provides an optical multiplexer, configured to multiplex at least four optical signals into one optical signal, and including: a first polarization state adjusting component, a second polarization state adjusting component, a first optical path changing component, a second optical path changing component, a polarization beam combiner, and a beam combiner, where the first polarization state adjusting component is configured to adjust a polarization state of a first optical signal in the at least four optical signals before the first optical signal is input into the polarization beam combiner, so that the first optical signal and a third optical signal in the at least four optical signals are capable of being combined into one optical signal in the polarization beam combiner;

the second polarization state adjusting component is configured to adjust a polarization state of a second optical signal in the at least four optical signals before the second optical signal is input into the polarization beam combiner, so that the second optical signal and a fourth optical signal in the at least four optical signals are capable of being combined into one optical signal in the polarization beam combiner;

the first optical path changing component is configured to change a propagation direction of the third optical signal and a propagation direction of the fourth optical signal, so that the signals are input into the polarization beam combiner;

the polarization beam combiner is configured to combine the first optical signal and the third optical signal that are received to obtain a fifth optical signal, and is further configured to combine the second optical signal and the fourth optical signal that are received to obtain a sixth optical signal;

the second optical path changing component is configured to change a propagation direction of the fifth optical signal or a propagation direction of the sixth optical signal output by the polarization beam combiner, so that the fifth optical signal and the sixth optical signal are capable of being combined by the beam combiner into one optical signal after being input into the beam combiner; and the beam combiner is configured to combine the fifth optical signal and the sixth optical signal that are received into one optical signal.

An embodiment of the present invention further provides an optical multiplexer, configured to multiplex at least four optical signals into one optical signal, and including: a first polarization state adjusting component, a second polarization state adjusting component, a first optical path changing component, a second optical path changing component, a third optical path changing component, a first polarization beam combiner, a second polarization beam combiner, and a beam combiner, where the first polarization state adjusting component is configured to adjust a polarization state of a first optical signal in the at least four optical signals before the first optical signal is input into the polarization beam combiner, so that the first optical signal and a second optical signal in the at least four optical signals are capable of being combined into one optical signal in the first polarization beam combiner;

the second polarization state adjusting component is configured to adjust a polarization state of a third optical signal in the at least four optical signals before the third optical signal is input into the polarization beam combiner, so that the third optical signal and a fourth optical signal in the at least four optical signals are capable of being combined into one optical signal in the second polarization beam combiner;

the first optical path changing component is configured to change a propagation direction of the second optical signal, so that the signal is input into the first polarization beam combiner;

the second optical path changing component is configured to change a propagation direction of the fourth optical signal, so that the signal is input into the second polarization beam combiner;

the first polarization beam combiner is configured to combine the first optical signal and the second optical signal that are received, and output a fifth optical signal;

the second polarization beam combiner is configured to combine the third optical signal and the fourth optical signal that are received, and output a sixth optical signal;

the third optical path changing component is configured to change a propagation direction of the fifth optical signal or a propagation direction of the sixth optical signal, so that the fifth optical signal and the sixth optical signal are combined by the beam combiner into one optical signal after being input into the beam combiner; and the beam combiner is configured to combine the fifth optical signal and the sixth optical signal that are received into one optical signal.

An embodiment of the present invention further provides an optical signal multiplexing method to multiplex at least four optical signals into one optical signal, including:

adjusting a polarization state of a first optical signal in the at least four optical signals so that the first optical signal and a second optical signal in the at least four optical signals are capable of being combined through polarization multiplexing into one optical signal; and adjusting a polarization state of a third optical signal in the at least four optical signals so that the third optical signal and a fourth optical signal in the at least four optical signals are capable of being combined through polarization multiplexing into one optical signal;

combining the first optical signal in the adjusted polarization state and the second optical signal through polarization multiplexing, and outputting a fifth optical signal; and combining the third optical signal in the adjusted polarization state and the fourth optical signal through polarization multiplexing, and outputting a sixth optical signal; and changing a propagation direction of the fifth optical signal or a propagation direction of the sixth optical signal, so that the fifth optical signal and the sixth optical signal are combined into one optical signal.

The optical multiplexer and the optical signal multiplexing method provided in the embodiments of the present invention use the polarization feature of laser light to change the polarization state of a part of multiple optical signals to be multiplexed, and then combine any one optical signal in the changed polarization state and any one optical signal in the unchanged polarization state into one optical signal through polarization multiplexing, and finally, the multiple optical signals obtained through polarization multiplexing are further combined into one optical signal. Based on polarization multiplexing, the solutions in the present invention reduce the number of reflections required for multiplexing multiple optical signals into one optical signal, and therefore, the optical multiplexer provided in the solutions of the present invention has a small volume, the optical paths traveled by different optical signals in the optical multiplexer differ slightly, and a small insertion loss is generated when the optical multiplexer presented in the solutions of the present invention is coupled to a fiber or a laser.

BRIEF DESCRIPTION OF DRAWINGS

To illustrate the technical solutions in the embodiments of the present invention or in the prior art more clearly, the following briefly introduces the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

To make the objectives, technical solutions, and advantages of the present invention more comprehensible, the following further describes the embodiments of the present invention in detail with reference to the accompanying drawings.

Embodiment 1

Figure 2A:
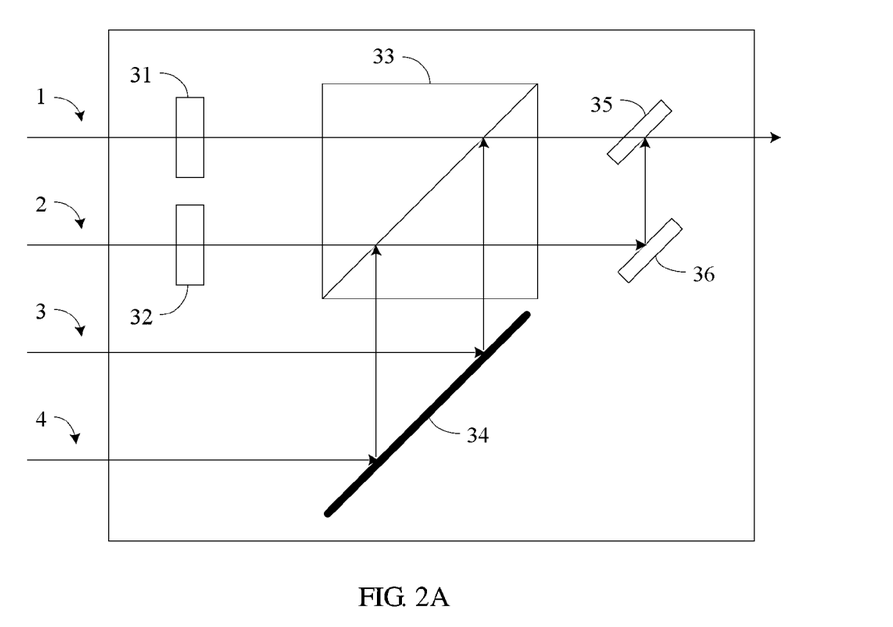
FIG. 2A is a first schematic structural diagram of an optical multiplexer according to Embodiment 1 of the present invention.

This embodiment provides an optical multiplexer, configured to multiplex at least four optical signals into one optical signal. As shown in FIG. 2A, the structure of the optical multiplexer includes at least: a polarization state adjusting component 31, a polarization state adjusting component 32, a polarization beam combiner 33, an optical path changing component 34, a beam combiner 35, and an optical path changing component 36.

The polarization state adjusting component 31 adjusts a polarization state of a first optical signal 1 input into the optical multiplexer, so that the first optical signal 1 and a third optical signal 3 input into the polarization beam combiner 33 can be combined into one optical signal by the polarization beam combiner 33.

The polarization state adjusting component 32 adjusts a polarization state of a second optical signal 2 input into the optical multiplexer, so that the second optical signal 2 and a fourth optical signal 4 input into the polarization beam combiner 33 can be combined into one optical signal by the polarization beam combiner 33.

The polarization state adjusting component 31 and the polarization state adjusting component 32 may specifically be wave plates. It should be noted that the polarization state adjusting component 31 and the polarization state adjusting component 32 may be any device capable of adjusting the polarization state, and are not limited to wave plates. In an embodiment, both the polarization state adjusting component 31 and the polarization state adjusting component 32 may be half-wave plates.

The optical path changing component 34 changes a propagation direction of the third optical signal 3 and a propagation direction of the fourth optical signal 4, so that the third optical signal 3 and the fourth optical signal 4 are input into the polarization beam combiner 33. The optical path changing component 34 may be a reflector or a prism, which is not specifically limited by the present invention. To reduce loss of optical signal energy, a reflection increasing film may be plated onto the reflector or the reflection side of the prism.

The polarization beam combiner 33 combines the received first optical signal 1 and third optical signal 3 to obtain a fifth optical signal, and the polarization beam combiner 33 combines the received second optical signal 2 and fourth optical signal 4 to obtain a sixth optical signal.

The polarization beam combiner combines two optical signals in different polarization states into one optical signal through polarization multiplexing. In this embodiment, after the first optical signal 1 passes through the polarization state adjusting component 31, the polarization state of the first optical signal changes, but before the third optical signal 3 is input into the polarization beam combiner 33, the polarization state of the third optical signal does not change. Therefore, the polarization state of the first optical signal 1 input into the polarization beam combiner 33 is different from the polarization state of the third optical signal 3 input into the polarization beam combiner 33, and the polarization state of the first optical signal 1 is changed to such an extent that the first optical signal 1 and the third optical signal 3 that are input into the polarization beam combiner 33 can be combined into one optical signal by the polarization beam combiner. In this way, the polarization beam combiner 33 can combine the received first optical signal 1 and third optical signal 3 into one optical signal. Similarly, the polarization beam combiner 33 can also combine the received second optical signal 2 and fourth optical signal 4 into one optical signal.

After the sixth optical signal output by the polarization beam combiner 33 passes through the optical path changing component 36, its propagation direction is changed, and the signal is input onto the beam combiner 35 at a proper angle, and then can be combined with the sixth optical signal input onto the beam combiner 35 into one optical signal. It should be noted that the optical path changing component 36 may be the same as or different from the optical path changing component 34, which is not limited by the present invention.

In this embodiment, the beam combiner 35 is placed on the optical path of the fifth optical signal output by the polarization beam combiner 33, and the optical path changing component 36 is placed on the optical path of the sixth optical signal output by the polarization beam combiner 33, so as to change the propagation direction of the sixth optical signal and input the sixth optical signal into the beam combiner 35. In another embodiment, the beam combiner 35 may be placed on the optical path of the sixth optical signal output by the polarization beam combiner 33, and the optical path changing component 36 is placed on the optical path of the fifth optical signal output by the polarization beam combiner 33, so as to change the propagation direction of the fifth optical signal and input the fifth optical signal into the beam combiner 35.

The beam combiner 35 exerts a transmission effect on the first optical signal 1 and the third optical signal 3, and exerts a reflection effect on the second optical signal 2 and the fourth optical signal 4. To reduce loss of optical signal energy, a transmission boosting film that boosts the transmission effect for the first optical signal 1 and the third optical signal 3 is plated on the beam combiner 35, and a reflection increasing film that boosts the reflection effect for the second optical signal 2 and the fourth optical signal 4 is also plated.

Figure 2B:
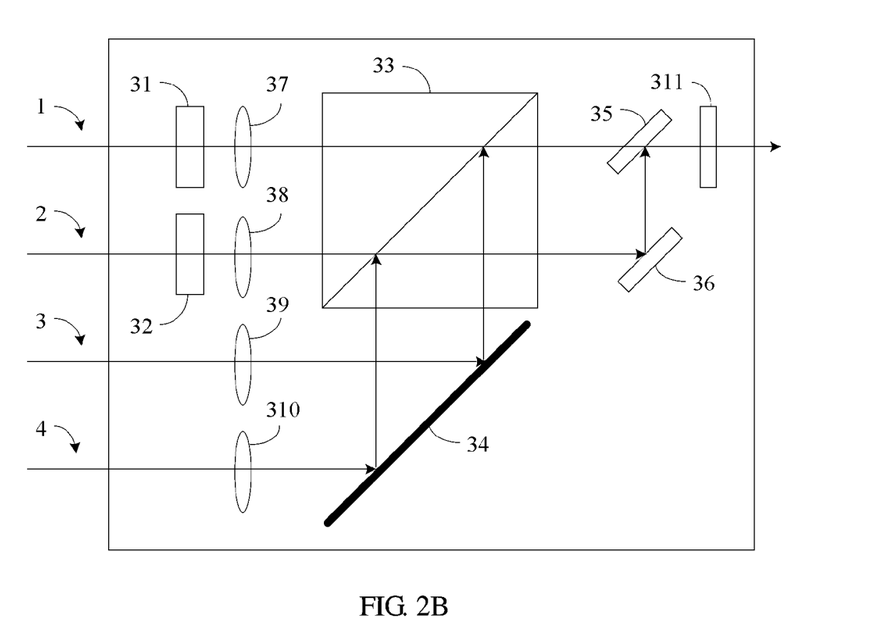
FIG. 2B is a second schematic structural diagram of the optical multiplexer according to Embodiment 1 of the present invention.

In another embodiment, as shown in FIG. 2B, the optical multiplexer provided in the present invention may further include four collimating components: a collimating component 37, a collimating component 38, a collimating component 39, and a collimating component 310. The four collimating components are located on the optical paths of the four optical signals input into the optical multiplexer, so as to collimate the beam on their respective optical paths so that the collimated beam has better directivity and intenser optical energy. In another embodiment, all the four collimating components may be collimation lens. The collimating components may specifically be located anywhere on the optical paths of the four optical signals in the optical multiplexer, and preferably, located near an input port of the optical multiplexer. The present invention does not limit the relative locations of the collimating component and the polarization state adjusting component.

In an embodiment, the optical multiplexer provided in the present invention may further include an optical isolator 311. As shown in FIG. 2B, the optical isolator is located behind the beam combiner 35 and located on an optical path of an optical signal output by the beam combiner 35, and is used to reduce the return loss.

Figure 2C:
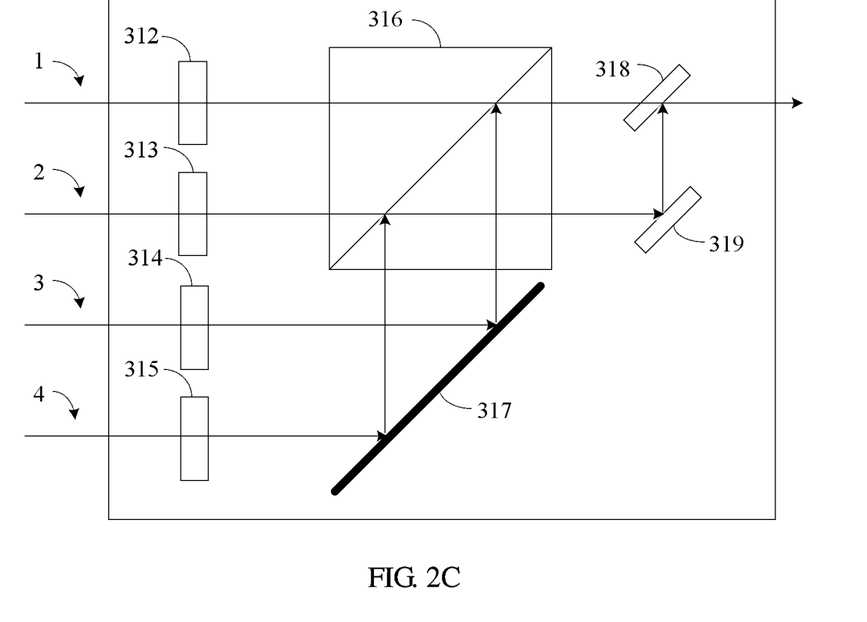
FIG. 2C is a third schematic structural diagram of the optical multiplexer according to Embodiment 1 of the present invention.

In an embodiment, as shown in FIG. 2C, the optical multiplexer provided in the present invention includes: a polarization state adjusting component 312, a polarization state adjusting component 313, a polarization state adjusting component 314, a polarization state adjusting component 315, a polarization beam combiner 316, an optical path changing component 317, an optical path changing component 319, and a beam combiner 318. In this embodiment, the polarization state adjusting component 312 changes the polarization state of the first optical signal 1 to the same extent as the change performed by the polarization state adjusting component 313 for the polarization state of the second optical signal 2; the polarization state adjusting component 314 changes the polarization state of the third optical signal 3 to the same extent as the change performed by the polarization state adjusting component 315 for the polarization state of the fourth optical signal 4; and the polarization state adjusting component 312 changes the polarization state of the first optical signal 1 to an extent different from the extent of the change performed by the polarization state adjusting component 314 for the polarization state of the third optical signal 3, so that the first optical signal 1 in the adjusted polarization state and the third optical signal 3 in the adjusted polarization state can be combined into one optical signal in the polarization beam combiner 316. Preferably, the polarization state of the first optical signal 1 output by the polarization state adjusting component 312 is orthogonal to the polarization state of the third optical signal 3 output by the polarization state adjusting component 314. In another embodiment, the polarization state adjusting components 312, 313, 314, and 315 may be wave plates, and preferably, both the polarization state adjusting component 312 and the polarization state adjusting component 313 are ¼-wave plates, and both the polarization state adjusting component 314 and the polarization state adjusting component 315 may be ¾-wave plates. In the optical multiplexer of a structure shown in FIG. 2C, the working principles of the polarization beam combiner 316 are the same as the working principles of the polarization beam combiner 33 in the optical multiplexer shown in FIG. 2A, but the selected devices differ slightly, and the optical axis of the polarization beam combiner 316 rotates by a certain degree of angle against the optical axis of the polarization beam combiner 33. For example, a proper polarization beam combiner 316 is selected so that it collaborates with the polarization state adjusting component 312 to bring the same effect as the collaboration between the polarization state adjusting component 31 and the polarization beam combiner 33 in the optical multiplexer shown in FIG. 2A. The optical path changing component 317, the beam combiner 318, and the optical path changing component 319 in the optical multiplexer of the structure shown in FIG. 2C are the same as the optical path changing component 34, the beam combiner 35, and the optical path changing component 36 in the optical multiplexer of the structure shown in FIG. 2A respectively, and are not described herein repeatedly.

Figure 2D:
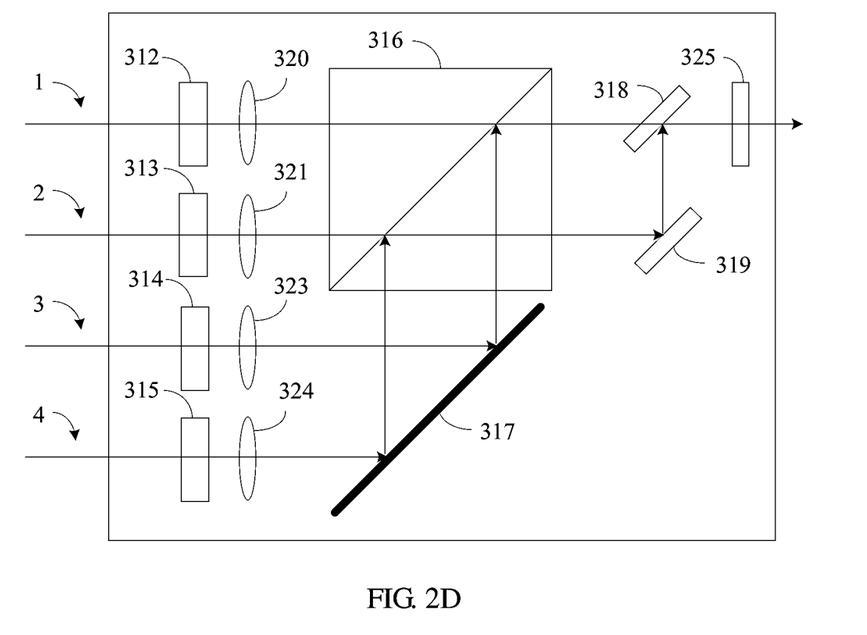
FIG. 2D is a fourth schematic structural diagram of the optical multiplexer according to Embodiment 1 of the present invention.

Compared with the optical multiplexer shown in FIG. 2C, the optical multiplexer provided in another embodiment, as shown in FIG. 2D, may further include: a collimating component 320, a collimating component 321, a collimating component 323, a collimating component 324, and an optical isolator 325. The collimating components and the optical isolator in this embodiment are the same as the collimating components and the optical isolator in the embodiment shown in FIG. 2B, and are not described herein repeatedly.

The optical multiplexer provided in the embodiment of the present invention uses the polarization feature of laser light to change the polarization state of the optical signal, and, based on polarization multiplexing, combines two optical signals in different polarization states into one optical signal, so as to reduce the number of reflections required for multiplexing multiple optical signals into one optical signal. Therefore, the optical multiplexer provided in the embodiment of the present invention has a small volume, and additionally, the power and the optical field energy distribution differ slightly between different optical signals in the multiplexed signal that is output, and a small insertion loss is generated in the coupling between the multiplexer provided in the embodiment of the present invention and a laser or a fiber.

Embodiment 2

Figure 3A:
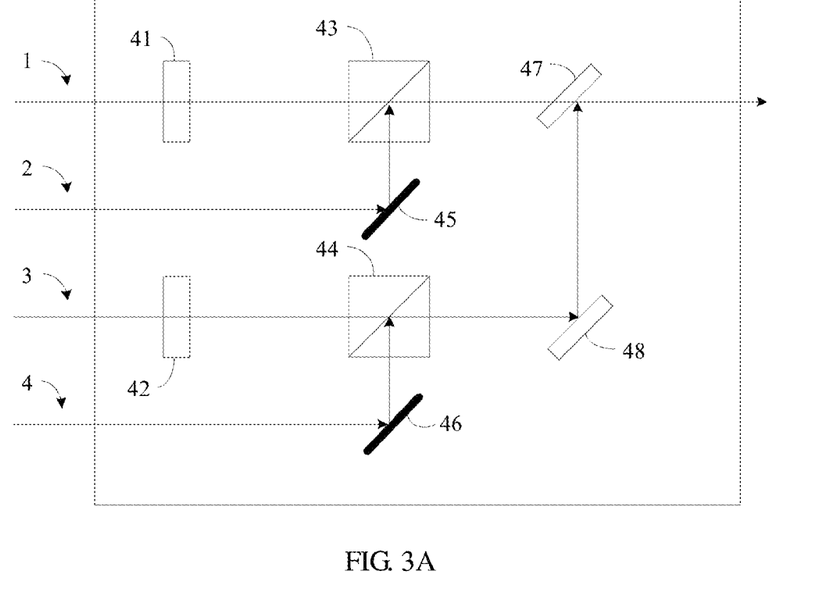
FIG. 3A is a first schematic structural diagram of an optical multiplexer according to Embodiment 2 of the present invention.

This embodiment provides an optical multiplexer, configured to multiplex at least four optical signals into one optical signal. As shown in FIG. 3A, the structure of the optical multiplexer includes at least: a polarization state adjusting component 41, a polarization state adjusting component 42, a polarization beam combiner 43, a polarization beam combiner 44, an optical path changing component 45, an optical path changing component 46, a beam combiner 47, and an optical path changing component 48.

The polarization state adjusting component 41 adjusts a polarization state of an input first optical signal 1, so that, after being input into the polarization beam combiner 43, the first optical signal 1 can be combined with a second optical signal 2 input in the polarization beam combiner 43 into one optical signal.

The polarization state adjusting component 42 adjusts a polarization state of an input third optical signal 3, so that, after being input into the polarization beam combiner 44, the third optical signal 3 can be combined with a fourth optical signal 4 input in the polarization beam combiner 44 into one optical signal.

The polarization state adjusting components 43 and 44 may specifically be wave plates. It should be noted that the polarization state adjusting components may be any component capable of adjusting the polarization state, and are not limited to wave plates. In another embodiment, both the polarization state adjusting component 43 and the polarization state adjusting component 44 may be half-wave plates.

The optical path changing component 45 changes a propagation direction of the second optical signal 2 input into the optical multiplexer, so that, after being input into the polarization beam combiner 43, the second optical signal 2 can be combined with the first optical signal 1 input in the polarization beam combiner 45 into one optical signal.

The optical path changing component 46 changes a propagation direction of the fourth optical signal 4 input into the optical multiplexer, so that, after being input into the polarization beam combiner 44, the fourth optical signal 4 can be combined with the third optical signal 3 input in the polarization beam combiner 46 into one optical signal.

The optical path changing components 45 and 46 may be reflectors or prisms, which are not limited by the present invention. To reduce loss of optical signal energy, a reflection increasing film may be plated onto the reflector or the reflection side of the prism.

The polarization beam combiner 43 combines the received first optical signal 1 and second optical signal 2 to obtain a fifth optical signal, and the polarization beam combiner 44 combines the received third optical signal 3 and fourth optical signal to obtain a sixth optical signal. The working principles of the polarization beam combiner 43 and the polarization beam combiner 44 are similar to the working principles of the polarization beam combiner in Embodiment 1, and are not repeated herein any further.

The fifth optical signal is directly input onto the beam combiner 47. After passing through the optical path changing component 48, the sixth optical signal changes its propagation direction and is input onto the beam combiner 47 at a proper degree of angle, so that the sixth optical signal and the fifth optical signal can be combined into one optical signal in the beam combiner 47.

In this embodiment, the beam combiner 47 is placed on the optical path of the fifth optical signal output by the polarization beam combiner 43, and the optical path changing component 48 is placed on the optical path of the sixth optical signal output by the polarization beam combiner 44, so as to change the propagation direction of the sixth optical signal and input the sixth optical signal into the beam combiner 47. In another embodiment, the beam combiner 47 may be placed on the optical path of the sixth optical signal output by the polarization beam combiner 43, and the optical path changing component 48 is placed on the optical path of the fifth optical signal output by the polarization beam combiner 43, so as to change the propagation direction of the fifth optical signal and input the fifth optical signal into the beam combiner 47.

The beam combiner 47 combines the received fifth optical signal and sixth optical signal into one optical signal. The beam combiner 47 exerts a transmission effect on the first optical signal 1 and the second optical signal 2, and exerts a reflection effect on the third optical signal 3 and the fourth optical signal 4. To reduce loss of optical signal energy, a transmission boosting film that boosts the transmission effect for the first optical signal 1 and the second optical signal 2 may be plated on the beam combiner 47, and a reflection increasing film that boosts the reflection effect for the third optical signal 3 and the fourth optical signal 4 may also be plated.

Figure 3B:
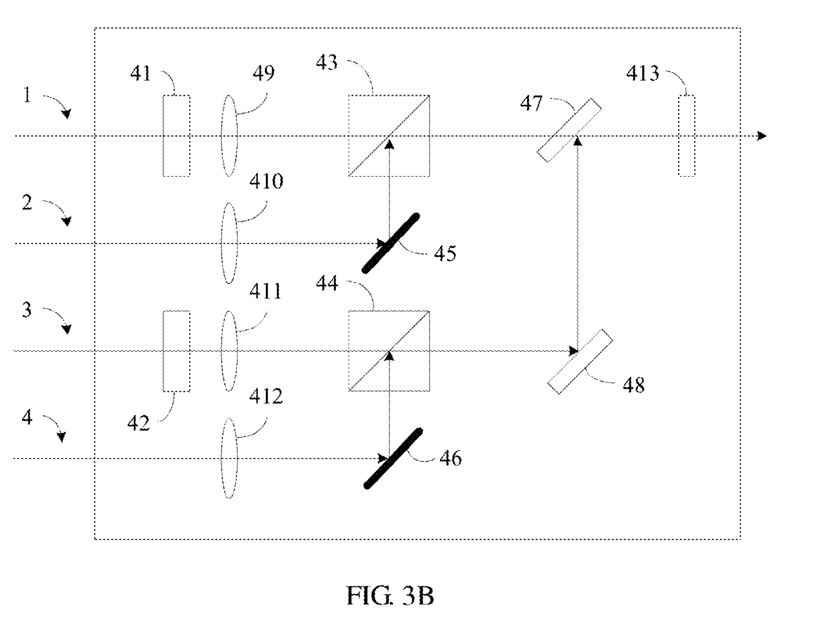
FIG. 3B is a second schematic structural diagram of an optical multiplexer according to Embodiment 2 of the present invention.

In another embodiment, as shown in FIG. 3B, the optical multiplexer provided in the present invention may further include four collimating components: a collimating component 49, a collimating component 410, a collimating component 411, and a collimating component 412. The four collimating components are located on the optical paths of the four optical signals input into the optical multiplexer, so as to collimate the beam on their respective optical paths so that the collimated beam has better directivity and intenser optical energy. In another embodiment, all the four collimating components may be collimation lens. The collimating components may specifically be located anywhere on the optical paths of the four optical signals in the optical multiplexer, and preferably, located near an input port of the optical multiplexer. The present invention does not limit the relative locations of the collimating component and the polarization state adjusting component.

The optical multiplexer provided in the present invention may further include an optical isolator 413. As shown in FIG. 3B, the optical isolator is located behind the beam combiner 47 and located on an optical path of an optical signal output by the beam combiner 47, and is used to reduce the return loss.

Figure 3C:
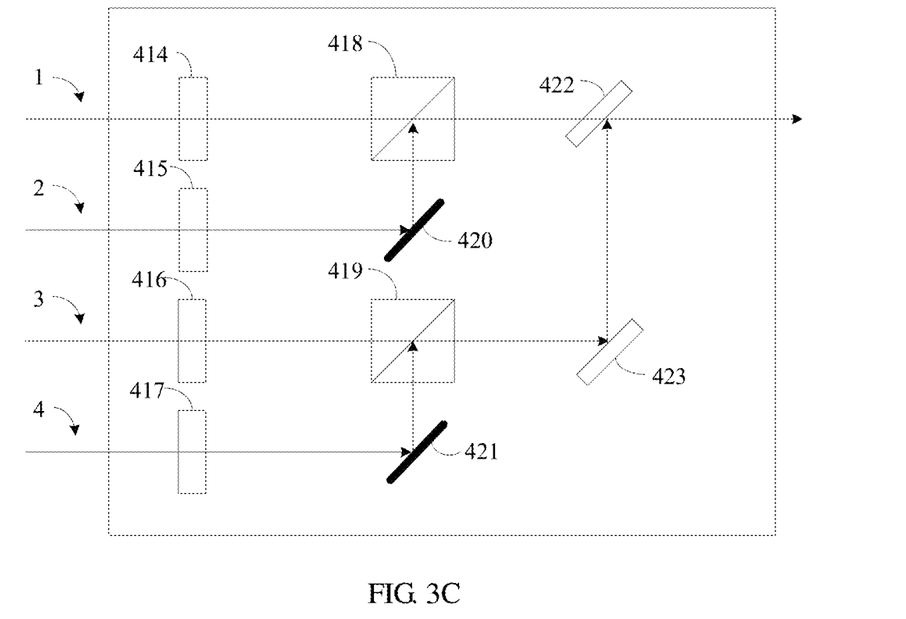
FIG. 3C is a third schematic structural diagram of the optical multiplexer according to Embodiment 2 of the present invention.

In an embodiment, as shown in FIG. 3C, the optical multiplexer provided in the present invention includes: a polarization state adjusting component 414, a polarization state adjusting component 415, a polarization state adjusting component 416, a polarization state adjusting component 417, a polarization beam combiner 418, a polarization beam combiner 419, an optical path changing component 420, an optical path changing component 421, a beam combiner 422, and an optical path changing component 423. In this embodiment, the polarization state adjusting component 414 changes the polarization state of the first optical signal 1 to an extent different from the extent of the change performed by the polarization state adjusting component 414 for the polarization state of the second optical signal 2, so that the first optical signal 1 in the adjusted polarization state and the second optical signal 2 in the adjusted polarization state can be combined into one optical signal in the polarization beam combiner 418. Preferably, the polarization state of the first optical signal 1 output by the polarization state adjusting component 414 is orthogonal to the polarization state of the second optical signal 2 output by the polarization state adjusting component 415. The polarization state adjusting component 416 changes the polarization state of the third optical signal 3 to an extent different from the extent of the change performed by the polarization state adjusting component 417 for the polarization state of the fourth optical signal 4, so that the third optical signal 3 in the adjusted polarization state and the fourth optical signal 4 in the adjusted polarization state can be combined into one optical signal in the polarization beam combiner 419. Preferably, the polarization state of the third optical signal 3 output by the polarization state adjusting component 416 is orthogonal to the polarization state of the fourth optical signal 4 output by the polarization state adjusting component 417. In another embodiment, the polarization state adjusting components 414, 415, 416, and 417 may be wave plates, and preferably, both the polarization state adjusting component 414 and the polarization state adjusting component 416 are ¼-wave plates, and both the polarization state adjusting component 415 and the polarization state adjusting component 417 may be ¾-wave plates. In the optical multiplexer of a structure shown in FIG. 3C, the working principles of the polarization beam combiners 418 and 419 are the same as the working principles of the polarization beam combiners 33 and 44 in the optical multiplexer shown in FIG. 3A, but the selected devices differ slightly, the optical axis of the polarization beam combiner 418 rotates by a certain degree of angle against the optical axis of the polarization beam combiner 43, and the optical axis of the polarization beam combiner 419 rotates by a certain degree of angle against the optical axis of the polarization beam combiner 44. For example, a proper polarization beam combiner 418 is selected so that it collaborates with the polarization state adjusting component 414 to bring the same effect as the collaboration between the polarization state adjusting component 41 and the polarization beam combiner 43 in the optical multiplexer shown in FIG. 3A; and a proper polarization beam combiner 419 is selected so that it collaborates with the polarization state adjusting component 416 to bring the same effect as the collaboration between the polarization state adjusting component 42 and the polarization beam combiner 44 in the optical multiplexer shown in FIG. 3A. The optical path changing component 420, the optical path changing component 421, the beam combiner 422, and the optical path changing component 423 in the optical multiplexer of the structure shown in FIG. 3C are the same as the optical path changing component 45, the optical path changing component 46, the beam combiner 47, and the optical path changing component 48 in the optical multiplexer of the structure shown in FIG. 3A respectively, and are not described herein repeatedly.

Figure 3D:
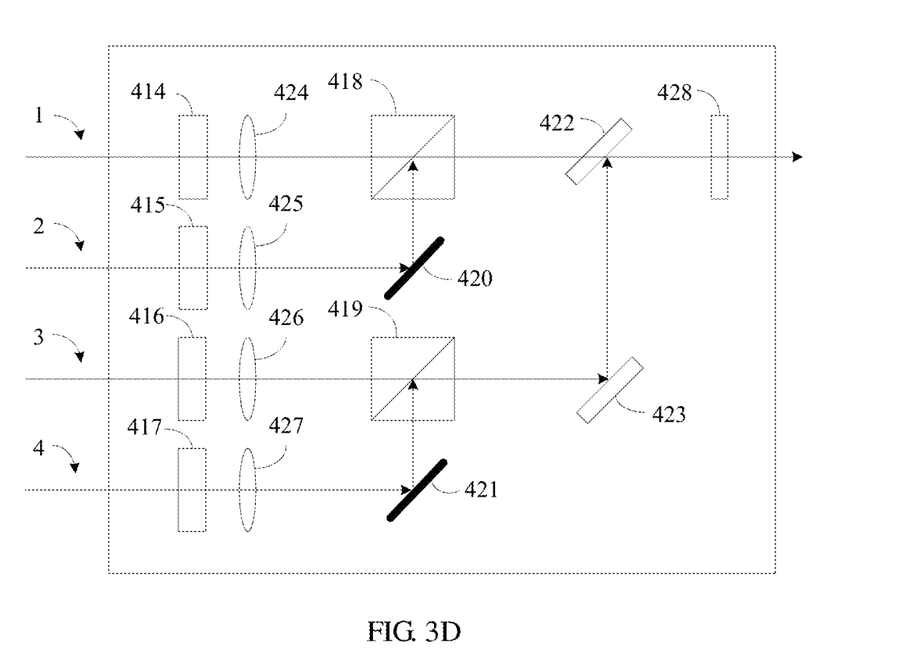
FIG. 3D is a fourth schematic structural diagram of the optical multiplexer according to Embodiment 2 of the present invention.

Compared with the optical multiplexer shown in FIG. 3C, the optical multiplexer provided in another embodiment, as shown in FIG. 3D, may further include: a collimating component 424, a collimating component 425, a collimating component 426, a collimating component 427, and an optical isolator 428. The collimating components and the optical isolator in this embodiment are the same as the collimating components and the optical isolator in the embodiment shown in FIG. 3B, and are not described herein repeatedly.

The optical multiplexer provided in the embodiment of the present invention uses the polarization feature of laser light to change the polarization state of the optical signal, and, based on polarization multiplexing, combines two optical signals in different polarization states into one optical signal, so as to reduce the number of reflections required for multiplexing multiple optical signals into one optical signal. Therefore, the optical multiplexer provided in the embodiment of the present invention has a small volume, and additionally, the power and the optical field energy distribution differ slightly between different optical signals in the multiplexed signal that is output, and a small insertion loss is generated in the coupling between the multiplexer provided in the embodiment of the present invention and a laser or a fiber.

Embodiment 3

Figure 4:
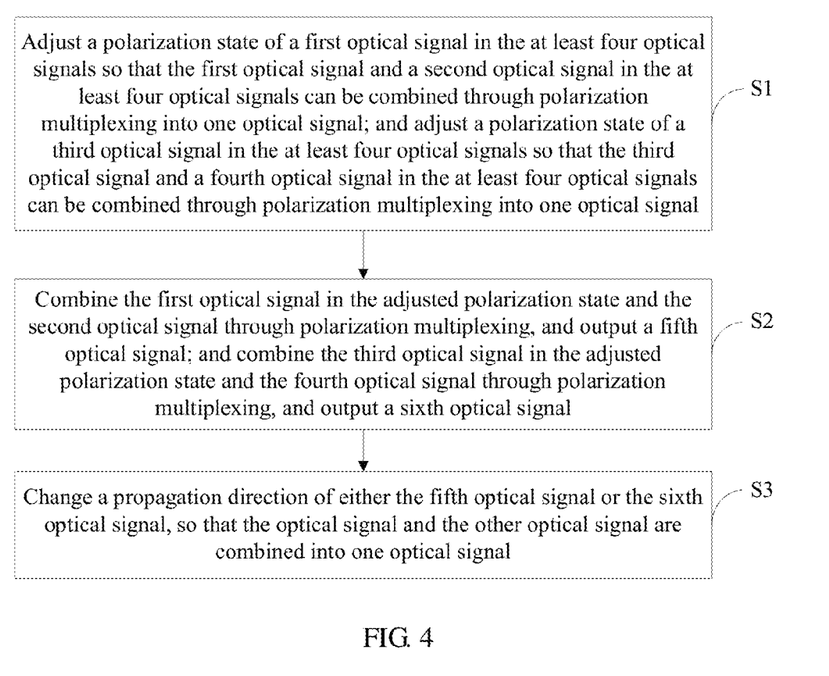
FIG. 4 is a schematic flowchart of an optical signal multiplexing method according to Embodiment 3 of the present invention.

Corresponding to the optical multiplexers provided in Embodiment 1 and Embodiment 2, the embodiment of the present invention further provides an optical signal multiplexing method to multiplex at least four optical signals into one optical signal. As shown in FIG. 4, the procedure includes the following steps:

Step S1: Adjust a polarization state of a first optical signal in the at least four optical signals so that the first optical signal and a second optical signal in the at least four optical signals can be combined through polarization multiplexing into one optical signal; and adjust a polarization state of a third optical signal in the at least four optical signals so that the third optical signal and a fourth optical signal in the at least four optical signals can be combined through polarization multiplexing into one optical signal.

Step S2: Combine the first optical signal in the adjusted polarization state and the second optical signal through polarization multiplexing, and output a fifth optical signal; and combine the third optical signal in the adjusted polarization state and the fourth optical signal through polarization multiplexing, and output a sixth optical signal.

Step S3: Change a propagation direction of the fifth optical signal or a propagation direction of the sixth optical signal, so that the optical signal and the other optical signal are combined into one optical signal.

In step S1, the polarization state of the optical signal may be adjusted by a polarization state adjusting component such as a wave plate. In a specific embodiment, a half-wave plate may be used to adjust the polarization states of the first optical signal and the third optical signal, and the polarization state after adjustment is mutually orthogonal to the polarization state before adjustment.

In another embodiment, the optical signal multiplexing method provided in the present invention may further include:

before the first optical signal in the adjusted polarization state is combined with the second optical signal through polarization multiplexing, adjusting also a polarization state of the second optical signal to be combined, so that, preferably, the polarization state of the second optical signal in the adjusted polarization state is mutually orthogonal to the polarization state of the first optical signal in the adjusted polarization state; and before the third optical signal in the adjusted polarization state is combined with the fourth optical signal through polarization multiplexing, adjusting also a polarization state of the fourth optical signal to be combined, so that, preferably, the polarization state of the fourth optical signal in the adjusted polarization state is mutually orthogonal to the polarization state of the third optical signal in the adjusted polarization state.

In this embodiment, the polarization states of the first optical signal and the third optical signal may be adjusted by using a ¼ wave plate, and the polarization states of the second optical signal and the fourth optical signal may be adjusted by using a ¾ wave plate.

In another embodiment, the optical signal multiplexing method provided in the present invention further includes:

collimating the first optical signal and the second optical signal before combining the first optical signal in the adjusted polarization state and the second optical signal through polarization multiplexing; and collimating the third optical signal and the fourth optical signal before combining the third optical signal in the adjusted polarization state and the fourth optical signal through polarization multiplexing.

It should be noted that the collimation for the optical signal may be performed before the polarization state of the optical signal is adjusted, or may be performed after the polarization state of the optical signal is adjusted, which are not limited by the present invention.

The optical signal multiplexing method provided in the embodiment of the present invention uses the polarization feature of laser light to change the polarization state of the optical signal, and, based on polarization multiplexing, combines two optical signals in different polarization states into one optical signal, so as to reduce the number of reflections required for multiplexing multiple optical signals into one optical signal. Therefore, after multiple signals are multiplexed into one signal according to the optical signal multiplexing method provided in the embodiment of the present invention, the power and the optical field energy distribution of all signals in the finally obtained multiplexed signal differ slightly.

In the above embodiments about the optical multiplexer and the optical signal multiplexing method, it is assumed that four optical signals are multiplexed into one optical signal. Understandably, when more than four optical signals are multiplexed into one signal, the solutions of the present invention are also applicable. For example, when five optical signals are multiplexed into one optical signal, four optical signals among them may be multiplexed into one optical signal according to the solution described above, and then be combined with the remaining optical signal into one optical signal.

The foregoing descriptions are merely specific embodiments of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. An optical multiplexer, configured to multiplex at least four optical signals into one optical signal, and comprising:
    a first polarization state adjusting component;
    a second polarization state adjusting component;
    a first optical path changing component;
    a second optical path changing component;
    a polarization beam combiner; and
    a beam combiner,
    wherein:
        the first polarization state adjusting component is configured to adjust a polarization state of a first optical signal in the at least four optical signals before the first optical signal is input into the polarization beam combiner;
        the second polarization state adjusting component is configured to adjust a polarization state of a second optical signal in the at least four optical signals before the second optical signal is input into the polarization beam combiner;

the first optical path changing component is configured to change a propagation direction of a third optical signal in the at least four optical signals, the third optical signal in a different polarization state than the polarization state of the first optical signal, and a propagation direction of a fourth optical signal in the at least four optical signals, the fourth optical signal in a different polarization state than the polarization state of the second optical signal, so that the third and fourth optical signals in the different polarization states than the polarization states of the first and second optical signals are input into the polarization beam combiner;

the polarization beam combiner is configured to combine the first and third optical signals that are received in the different polarization states to obtain a fifth optical signal, and is further configured to combine the second and fourth optical signals that are received in the different polarization states to obtain a sixth optical signal;

the second optical path changing component is configured to change a propagation direction of the fifth optical signal or a propagation direction of the sixth optical signal output by the polarization beam combiner, so that the fifth optical signal and the sixth optical signal are combined by the beam combiner into one optical signal after being input into the beam combiner; and the beam combiner is configured to combine the fifth optical signal and the sixth optical signal that are received into one optical signal.

2. The optical multiplexer according to claim 1, wherein the first polarization state adjusting component and the second polarization state adjusting component are half-wave plates.

3. The optical multiplexer according to claim 1, wherein the optical multiplexer further comprises a third polarization state adjusting component and a fourth polarization state adjusting component, wherein the third polarization state adjusting component is configured to adjust a polarization state of the third optical signal to a different polarization state than the polarization state of the first optical signal before the third optical signal is input into the polarization beam combiner, so that the third optical signal in the adjusted polarization state and the first optical signal in the adjusted polarization state are combined into one optical signal in the polarization beam combiner; and the fourth polarization state adjusting component is configured to adjust a polarization state of the fourth optical signal to a different polarization state than the polarization state of the second optical signal before the fourth optical signal is input into the polarization beam combiner, so that the fourth optical signal in the adjusted polarization state and the second optical signal in the adjusted polarization state are combined into one optical signal in the polarization beam combiner.

4. The optical multiplexer according to claim 3, wherein the first polarization state adjusting component and the second polarization state adjusting component are ¼-wave plates, and the third polarization state adjusting component and the fourth polarization state adjusting component are ¾-wave plates.

5. The optical multiplexer according to claim 1, further comprising:

a first collimating component, configured to collimate the first optical signal before the first optical signal is input into the polarization beam combiner;

a second collimating component, configured to collimate the second optical signal before the second optical signal is input into the polarization beam combiner;

a third collimating component, configured to collimate the third optical signal before the third optical signal is input into the polarization beam combiner; and a fourth collimating component, configured to collimate the fourth optical signal before the fourth optical signal is input into the polarization beam combiner.

6. The optical multiplexer according to claim 1, further comprising an optical isolator, wherein the optical isolator is located behind the beam combiner and located on an optical path of an optical signal output by the beam combiner.

7. An optical multiplexer, configured to multiplex at least four optical signals into one optical signal, and comprising at least:

a first polarization state adjusting component,
a second polarization state adjusting component,
a first optical path changing component,
a second optical path changing component,
a third optical path changing component,
a first polarization beam combiner,
a second polarization beam combiner, and
a beam combiner, wherein:

the first polarization state adjusting component is configured to adjust a polarization state of a first optical signal in the at least four optical signals before the first optical signal is input into the polarization beam combiner;

the second polarization state adjusting component is configured to adjust a polarization state of a third optical signal in the at least four optical signals before the third optical signal is input into the polarization beam combiner;

the first optical path changing component is configured to change a propagation direction of a second optical signal in the at least four optical signals, the second optical signal in a different polarization state than the polarization state of the first optical signal, so that the signal is input into the first polarization beam combiner;

the second optical path changing component is configured to change a propagation direction of the fourth optical signal in the at least four optical signals, a fourth optical signal in a different polarization state than the polarization state of the third optical signal, so that the signal is input into the second polarization beam combiner;

the first polarization beam combiner is configured to combine the first optical signal and the second optical signal that are received in different polarization states, and output a fifth optical signal;

the second polarization beam combiner is configured to combine the third optical signal and the fourth optical signal that are received in different polarization states, and output a sixth optical signal;

the third optical path changing component is configured to change a propagation direction of the fifth optical signal or a propagation direction of the sixth optical signal, so that the fifth optical signal and the sixth optical signal are combined by the beam combiner into one optical signal after being input into the beam combiner; and the beam combiner is configured to combine the fifth optical signal and the sixth optical signal that are received into one optical signal.

8. The optical multiplexer according to claim 7, wherein the first polarization state adjusting component and the second polarization state adjusting component are half-wave plates.

9. The optical multiplexer according to claim 7, wherein the optical multiplexer further comprises a third polarization state adjusting component and a fourth polarization state adjusting component;

the third polarization state adjusting component is configured to adjust a polarization state of the second optical signal to a different polarization state than the polarization state of the first optical signal before the second optical signal is input into the polarization beam combiner, so that the second optical signal in the adjusted polarization state and the first optical signal in the adjusted polarization state are combined into one optical signal in the first polarization beam combiner; and the fourth polarization state adjusting component is configured to adjust a polarization state of the fourth optical signal to a different polarization state than the polarization state of the third optical signal before the fourth optical signal is input into the polarization beam combiner, so that the fourth optical signal in the adjusted polarization state and the third optical signal in the adjusted polarization state are combined into one optical signal in the second polarization beam combiner.

10. The optical multiplexer according to claim 9, wherein the first polarization state adjusting component and the second polarization state adjusting component are ¼-wave plates, and the third polarization state adjusting component and the fourth polarization state adjusting component are ¾-wave plates.

11. The optical multiplexer according to claim 7, further comprising:

a first collimating component, configured to collimate the first optical signal before the first optical signal is input into the polarization beam combiner;

a second collimating component, configured to collimate the second optical signal before the second optical signal is input into the polarization beam combiner;

a third collimating component, configured to collimate the third optical signal before the third optical signal is input into the polarization beam combiner; and a fourth collimating component, configured to collimate the fourth optical signal before the fourth optical signal is input into the polarization beam combiner.

12. The optical multiplexer according to claim 7, further comprising an optical isolator, wherein the optical isolator is located behind the beam combiner and located on an optical path of an optical signal output by the beam combiner.

13. An optical signal multiplexing method to multiplex at least four optical signals into one optical signal, comprising:

adjusting a polarization state of a first optical signal in the at least four optical signals to be in a different polarization state than a second optical signal in the at least four optical signals, so that the polarization state of the second optical signal is mutually orthogonal to the polarization state of the first optical signal in the adjusted polarization state, before combining the first optical signal in the adjusted polarization state and the second optical signal in the adjusted polarization state through polarization multiplexing in the different polarization states into one optical signal;

adjusting a polarization state of a third optical signal in the at least four optical signals to be in a different polarization state than a fourth optical signal in the at least four optical signals, so that the polarization state of the fourth optical signal is mutually orthogonal to the polarization state of the third optical signal in the adjusted polarization state, before combining the third optical signal in the adjusted polarization state and the fourth optical signal in the adjusted polarization state through polarization multiplexing in the different polarization states into one optical signal;

combining the first optical signal and the second optical signal through the polarization multiplexing of the first and second optical signals in the different polarization states to output a fifth optical signal;

combining the third optical signal and the fourth optical signal through the polarization multiplexing of the third and fourth optical signals in the different polarization states to output a sixth optical signal; and changing a propagation direction of the fifth optical signal or a propagation direction of the sixth optical signal, so that the fifth optical signal and the sixth optical signal are combined into one optical signal.

14. The method according to claim 13, further comprising:

collimating the first optical signal and the second optical signal before combining the first optical signal in the adjusted polarization state and the second optical signal through polarization multiplexing; and collimating the third optical signal and the fourth optical signal before combining the third optical signal in the adjusted polarization state and the fourth optical signal through polarization multiplexing.

\* \* \* \* \*